United States Patent
Ahuja et al.

(10) Patent No.: US 10,970,898 B2
(45) Date of Patent: Apr. 6, 2021

(54) VIRTUAL-REALITY BASED INTERACTIVE AUDIENCE SIMULATION

(71) Applicant: International Business Machines Corporation, Armonk, NY (US)

(72) Inventors: Sarthak Ahuja, New Delhi (IN); Joydeep Mondal, New Delhi (IN); Kushal Mukherjee, New Delhi (IN); Sudhanshu Shekhar Singh, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/156,377

(22) Filed: Oct. 10, 2018

(65) Prior Publication Data

US 2020/0118312 A1 Apr. 16, 2020

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00255* (2013.01); *G06K 9/00302* (2013.01);
(Continued)

(58) Field of Classification Search
CPC ...... G06F 3/011; G06F 16/9535; G06F 3/017; G06F 3/013; G06F 19/36; G06F 3/0346; G06F 3/0308; G06F 3/04815; G06F 2203/013; G06F 3/0325; G06F 3/0482; G06F 3/04847; G06F 3/012; G06F 19/00; G06F 1/163; G10H 1/368; G10H 2210/091; G10H 2220/015; G10H 2220/151; G10H 1/0083; G10H 2220/141; G10H 3/125
See application file for complete search history.

(56) References Cited

U.S. PATENT DOCUMENTS 5,597,359 A 1/1997 Byerly
6,409,599 B1 6/2002 Sprout et al.
(Continued)

FOREIGN PATENT DOCUMENTS

EP 1505829 A1 9/2005

*Primary Examiner* — Joseph G Ustaris
*Assistant Examiner* — Kehinde Abimbola
(74) *Attorney, Agent, or Firm* — Ryan, Mason & Lewis, LLP

(57) ABSTRACT

Methods, systems and computer program products for generating virtual reality (VR)-based interactive audience simulations are provided herein. A computer-implemented method includes determining one or more situational and location characteristics for a given performance by a user, generating a VR-based simulated audience for the given performance based at least in part on the determined situational and location characteristics, presenting the VR-based simulated audience to a user during the given performance utilizing a VR headset, utilizing one or more sensors to measure one or more aspects of the given performance before the VR-based simulated audience, and generating real-time feedback adjusting the VR-based simulated audience presented to the user utilizing the VR headset based at least in part on the measured aspects of the given performance.

15 Claims, 9 Drawing Sheets

(51) Int. Cl.
*G09B 19/00* (2006.01)
*G10L 15/26* (2006.01)
*G10L 25/63* (2013.01)

(52) U.S. Cl.
CPC ......... *G06K 9/00604* (2013.01); *G09B 19/00* (2013.01); *G10L 15/26* (2013.01); *G10L 25/63* (2013.01)

(56) References Cited

U.S. PATENT DOCUMENTS

| | | | |
|---|---|---|---|
| 6,665,985 B1 | 12/2003 | Hennes | |
| 7,164,076 B2 * | 1/2007 | McHale | G10H 1/368 434/307 A |
| 9,581,962 B1 * | 2/2017 | Duffy | G03H 1/0005 |
| 9,769,101 B2 * | 9/2017 | Tejaprakash | H04L 51/14 |
| 10,252,145 B2 * | 4/2019 | Tran | H04N 5/2257 |
| 2005/0252362 A1 * | 11/2005 | McHale | G10H 1/368 84/616 |
| 2005/0255914 A1 * | 11/2005 | McHale | A63F 13/10 463/31 |
| 2006/0009979 A1 * | 1/2006 | McHale | A63F 13/10 704/270 |
| 2009/0198488 A1 * | 8/2009 | Vigen | G06F 40/30 704/9 |
| 2010/0300006 A1 | 12/2010 | Magpuri | |
| 2011/0256520 A1 * | 10/2011 | Siefert | G09B 5/10 434/322 |
| 2013/0310122 A1 | 11/2013 | Piccionielli | |
| 2016/0035016 A1 * | 2/2016 | Spio | G06Q 30/0643 705/27.2 |
| 2016/0042648 A1 | 2/2016 | Kothuri | |
| 2016/0049094 A1 | 2/2016 | Gupta et al. | |
| 2016/0077547 A1 | 3/2016 | Aimone et al. | |
| 2016/0205053 A1 * | 7/2016 | Tejaprakash | H04L 51/14 709/206 |
| 2017/0105052 A1 | 4/2017 | DeFaria et al. | |
| 2017/0277122 A1 * | 9/2017 | Duffy | G03H 1/0005 |
| 2017/0278140 A1 * | 9/2017 | Duffy | G03H 1/0005 |
| 2018/0012630 A1 * | 1/2018 | Thomee | G11B 27/036 |
| 2018/0078843 A1 * | 3/2018 | Tran | A61B 5/6895 |
| 2018/0093185 A1 * | 4/2018 | Black | A63F 13/26 |
| 2018/0295419 A1 * | 10/2018 | Thielen | G09B 5/065 |
| 2019/0130788 A1 * | 5/2019 | Seaton | G06F 3/014 |
| 2019/0251622 A1 * | 8/2019 | Wiedmeyer | G06Q 30/0623 |

\* cited by examiner

VIRTUAL-REALITY BASED INTERACTIVE AUDIENCE SIMULATION

FIELD

The present invention relates to information technology, and, more particularly, to virtual reality systems.

BACKGROUND

Addressing an audience is a common task or challenge faced in a wide variety of use case scenarios. Such use case scenarios include but are not limited to pitching ideas to investors, sales pitches, giving technical or other presentations to peers, students, etc. Further use case scenarios involve entertainment scenarios, such as in live music performances, stand-up comedy performances, poetry or other literary performances, etc. As virtual reality (VR) systems become more immersive and capable, both in terms of sensing and providing stimuli, VR is becoming a viable option for serving as a potential medium to assist individuals or entities with preparing for a presentation or other performance.

SUMMARY

Embodiments of the invention provide techniques for generating VR-based interactive audience simulations, and for providing post-performance analysis of performances made utilizing VR-based interactive audience simulations.

In one embodiment, an exemplary computer-implemented method comprises steps of determining one or more situational and location characteristics for a given performance by a user, generating a VR-based simulated audience for the given performance based at least in part on the determined situational and location characteristics, presenting the VR-based simulated audience to a user during the given performance utilizing a VR headset, utilizing one or more sensors to measure one or more aspects of the given performance before the VR-based simulated audience, and generating real-time feedback adjusting the VR-based simulated audience presented to the user utilizing the VR headset based at least in part on the measured aspects of the given performance. The steps are carried out by at least one computing device.

In another embodiment, an exemplary computer-implemented method comprises steps of presenting a VR-based simulated audience to a user utilizing a VR headset during a given performance by the user, utilizing one or more sensors to measure one or more aspects of the user during the given performance before the VR-based simulated audience, adjusting the VR-based simulated audience presented to the user utilizing the VR headset based at least in part on the measured aspects of the given performance, and generating a report comprising feedback for the user relating to the given performance, the feedback being based at least in part on a demeanor of the user during the given performance and content of the given performance. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for generating virtual reality-based audience simulations. However, it is to be understood that embodiments of the invention are not limited to the illustrative methods, systems and devices but instead are more broadly applicable to other suitable methods, systems and devices.

Illustrative embodiments provide a complete system for generating VR-based audience simulations, including generating a simulated audience while providing a wide range of customizations for making the simulated audience as specific to a particular context as possible. Some embodiments provide techniques for creating interactive simulated audiences for any activity, with the interactive simulated audience being capable of providing real-time reaction to an individual interacting with the simulated audience (e.g., an individual giving a presentation or other performance to the simulated audience). Some embodiments further provide for post-activity feedback generation and performance analysis, based at least in part on simulated audience reactions and the content of the individual's presentation or performance to the simulated audience.

As used herein, the term "virtual reality" or VR is intended to be construed broadly, so as to encompass not only visual aspects but various other types of simulation including but not limited to auditory, olfactory, touch, etc. Thus, VR devices or systems are not limited to VR headsets or other types of visual VR-based devices, but also include other types of devices and sensors including microphones, speakers, epidermal sensors, olfactory sensors and actuators, haptic sensors and actuators, etc. that are capable of sensing and transmitting various stimuli for providing an immersive VR simulation.

Figure 1:
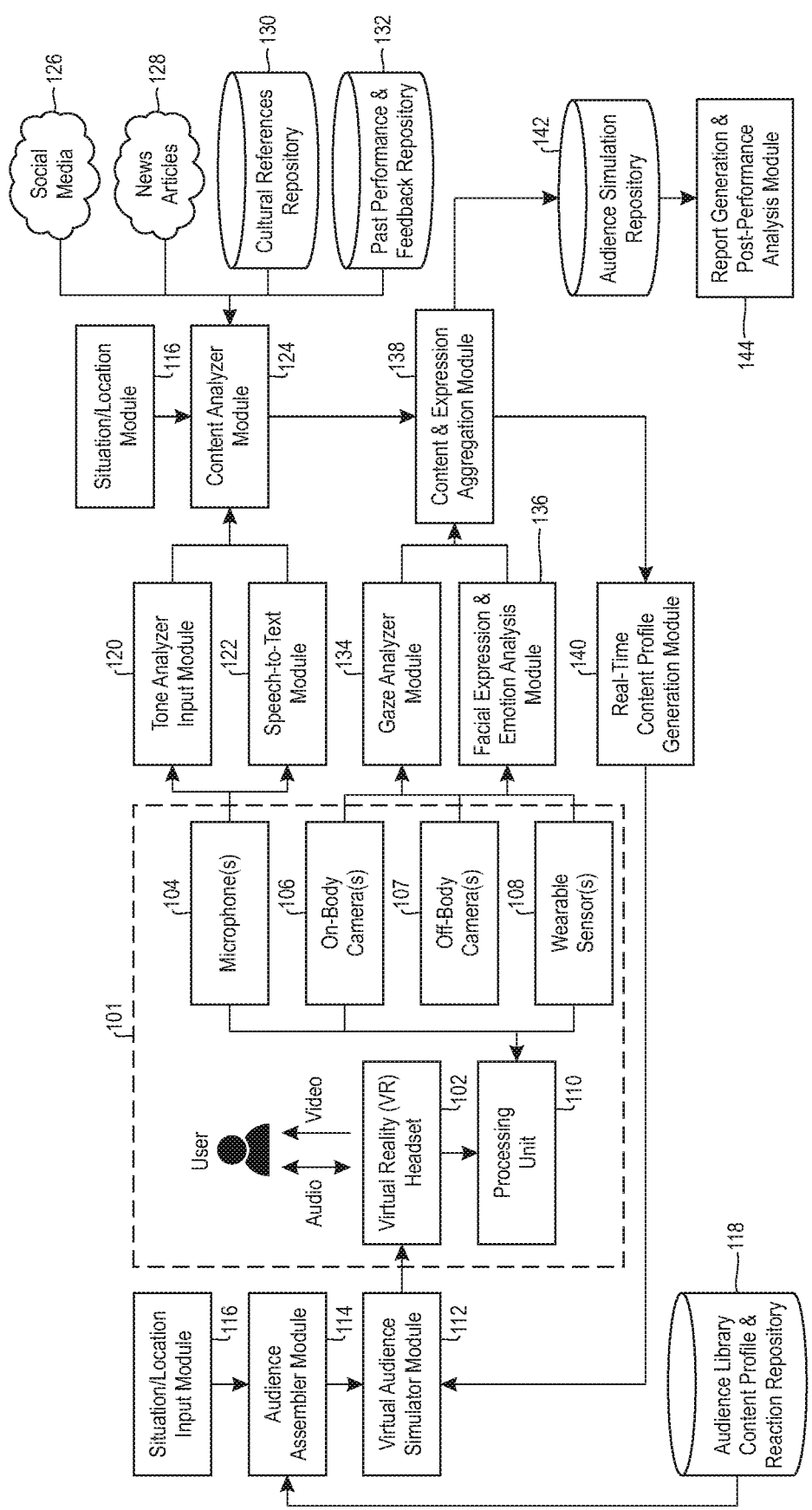
FIG. 1 depicts a virtual-reality based system for generating audience simulations, according to an exemplary embodiment of the present invention.

FIG. 1 depicts a VR-based system 100 for generating interactive audience simulations. The VR-based system 100 includes a user 101 and an associated VR headset 102, microphones 104, on-body cameras 106, off-body cameras 107 and wearable sensors 108. The user is also associated with a processing unit 110 providing a processing or computing device that combines information from the VR headset 102, microphones 104, on-body cameras 106, off-body cameras 107 and wearable sensors 108 to generate interactive VR-based audience simulations (e.g., via modules and/or repositories 112 through 144 described in further detail below).

The VR headset 102 may include any type of VR headset or device that may be worn or otherwise utilized to provide stimulus to the user 101 for providing a VR simulation. In some embodiments, the VR headset 102 provides video and audio stimulus to the user 101, and may receive audio stimulus from the user 101. The VR headset 102 may be further equipped with various types of motion sensors (e.g., accelerometers, gyroscopes, etc.) and other sensors for providing a VR simulation to the user 101 and allowing the user 101 to interact with the VR simulation. Although not shown in FIG. 1, the VR headset 102 or other elements of system 100 may be configured to exchange various other stimuli with the user 101 for providing a VR simulation, such as olfactory or haptic stimulus.

The user 101 in the system 100 is shown associated with a number of other sensing devices including microphones 104, on-body cameras 106, off-body cameras 107 and wearable sensors 108. The microphones 104 may be attached to the user 101, or placed in and around a room or other area in which the user 101 is present. One or more of the microphones 104, for example, may be affixed to the user 101 or proximate to the user 101 for capturing speech or other audio of the user's 101 performance. One or more other ones of the microphones 104 may be placed in other areas of a room or other area in which the user 101 is present, so as to measure how the voice or performance of the user 101 would be heard by an audience that is at various distances or locations relative to the user 101. For example, multiple microphones 104 may be placed at different distances from the user 101, possibly at different elevations, so as to capture the voice of the user 101 to determine how audience members sitting at different locations (e.g., audience members to the front and side of the user 101, audience members that are in a first few rows of seats versus back rows of seats in a theater, etc.) in a room or theater would experience the performance.

On-body cameras 106 may be similarly placed on or proximate the user 101 to capture various aspects of a performance of the user 101, such as to capture a perspective of the audience (e.g., where the user 101 is looking or facing, etc.). Off-body cameras 107 may also be placed at different locations to capture various aspects of the performance of the user 101 (e.g., to capture facial expressions and emotions of the user 101, etc.). Wearable sensors 108 may include motion sensors and other types of sensors which capture aspects of the performance of the user 101 (e.g., a posture of the user 101, whether the user 101 is moving about a stage, etc.).

The VR headset 102 is configured to provide a VR-based interactive audience simulation to the user 101. For example, the VR headset 102, possibly in conjunction with processing unit 110, can implement a virtual audience simulator module 112 that utilizes various information to generate the VR-based interactive audience simulation. An audience assembler module 114 may utilize information from a situation and location input module 116 as well as an audience library content profile and reaction repository 118 to assemble a VR-based interactive audience. The situation and location input module 116, for example, may provide context such as a situation for a particular performance of the user 101 (e.g., a type of performance, a size of the audience, etc.) as well as a location for the performance of the user 101 (e.g., a particular stage, theater, room, etc. in which the performance takes place, a geographic location where the performance takes place, etc.). The audience assembler module 114 can utilize such information to query the audience library content profile and reaction repository module 118 to obtain relevant simulated audiences. For example, depending on the location where the performance takes place (e.g., in an indoor versus outdoor theater), the types of dress of members of the simulated audience may vary. As another example, the situation (e.g., business presentation versus entertainment performance) may also alter the types of members of the simulated audience.

Still further, the situation and location may be used by the audience assembler module 114 to query the repository 118 to provide more accurate interactive elements of the simulated audience. In some embodiments, the repository 118 may contain information regarding how simulated audience members in different situations and locations will react to different types or aspects of a performance. For example, certain venues or locations may be known for having audiences that are particularly loud or noisy, or have various attention spans. As another example, different situations may lead to different reactions of audience members. Consider a business presentation versus an entertainment performance. While an entertainment performance (e.g., a concert, a standup comedy routine, etc.) may be expected to have audience reactions such as clapping, laughter, boos, etc., a business presentation may not expect to have such audience reactions.

The virtual audience simulator module 112 may further take into account information from real-time content profile generation module 140 in generating the VR-based interactive audience simulation provided by the VR headset 102. The real-time content profile generation module 140 may provide real-time feedback on the user 101 giving a performance, which may be used by the virtual audience simulator module 112 (and audience assembler module 114) to alter or update the VR-based interactive audience simulation provided by the VR headset 102. For example, the real-time feedback provided by the real-time content profile generation module 140 may cause the audience assembler module 114 to obtain different information from the repository 118 (e.g., causing changes or reaction in the VR-based interactive audience simulation) in response to the tone, content, facial expression or other information related to the performance of the user 101. The real-time content profile generation module 140 will be described in further detail below.

A tone analyzer module 120 may utilize information from the microphones 104 or other sensors associated with user 101 to analyze the tone of the user 101 during the performance. For example, the tone of the user 101 may indicate nervousness, anger, humor, joy, interest or lack thereof, etc. as the user 101 speaks. Such information may be utilized to provide feedback for the VR-based interactive audience simulation. If the tone analyzer module 120 determines that the user 101 lacks interest or enthusiasm, this may be reflected similarly in having audience members in the VR-based interactive audience simulation start to talk to one another, appear distracted or otherwise uninterested in the user's performance, etc.

A speech-to-text module 122 may also utilize information from the microphones 104 or other sensors associated with the user 101, so as to record what the user 101 says during the performance. Such information may be provided, along with tone determined using the tone analyzer module 120, to a content analyzer module 124. The content analyzer module 124 utilizes the text and tone of the performance of the user 101, along with situation and location provided by situation and location input module 116 and information from various other sources such as social media 126, news articles 128, a cultural references repository 130 and past performance and feedback repository 132 to analyze the content of the performance of the user 101. Social media 126 and news articles 128 may be collected, for example, to determine reactions to the content of a speech based at least in part on current events, trends, topics, etc. The cultural references repository 130 and past performance and feedback repository 132 may be used to generate a cultural audit profile which characterizes how a particular audience would react to the content of the performance of the user 101. For example, the audience reaction to a standup comedy performance may vary based at least in part on familiarity with different cultural norms or references, based at least in part on the age or other demographics of the audience, etc. Machine learning techniques may be utilized by the content analyzer module 124 to take in the various information from tone analyzer module 120, speech-to-text module 122, situation and location input module 116, social media 126, news articles 128, cultural references repository 130 and/or past performance and feedback repository 132.

The content analyzer module 124 in some embodiments may be used to perform what is referred to as a cultural audit of the content of the performance of the user 101. The cultural audit may involve processing/collecting social media 126 and news articles 128 for topics and trends, possibly based at least in part on geographic location or other situation provided by situation and location input module 116. As a result, the content analyzer module 124 is able to identify public sentiment and keywords on social media posts for these topics and trends.

The content analyzer module 124 may further utilize information from the past performance and feedback repository 132 to learn from recordings or other reports of past performances, possibly specific to a particular geographic region or other location or situation (e.g., context) provided by situation and location input module 116, to identify topic trends and audience reaction to the same. Such information may be used in part to build a growing repository of cultural references and sentiment (e.g., cultural references repository 130). During real performances (e.g., not before VR-based simulated audiences), audience reaction may be recorded as states (e.g., amused, distracted, silent, loud, etc.) where the performer is being analyzed as described herein. The content analyzer module 124 may be configured to utilize machine learning techniques (e.g., rule mining, supervised learning, etc.) to learn the topics, trends and audience reactions to the same.

In some embodiments, the cultural audit includes input of the user acting out a performance before the VR-based interactive simulated audience. The simulated audience is generated based at least in part on the geographical culture of the place or location of the performance, and is capable of understanding and reacting to the performance in a way that people of that geography and culture would do. As output, the user gets simulated feedback in real time, permitting the user to correct or adjust the performance to account for various aspects such as culturally sensitive topics, gestures, expressions, etc. The simulated audience and their associated reactions to the performance are not "generic" but are instead made dependent on the context, including by way of example the situation and location (e.g., the culture of the place of performance).

A gaze analysis module 134 and a facial expression and emotion analysis module 136 may utilize information from on-body cameras 106, off-body cameras 107, wearable sensors 108 and possibly other sensors associated with the user 101 to generate additional context or information regarding the performance of the user 101. For example, gaze analysis module 134 may take in information from on-body cameras 106, off-body cameras 107 and wearable sensors 108 to determine where the user 101 is looking during the performance. If the user 101 looks too long at a particular portion of the VR-based interactive simulated audience, this may cause feedback which results in ignored sections of the VR-based interactive simulated audience appearing disinterested or restless, talking amongst themselves, etc.

The facial expression and emotion analysis module 136 may take in information from on-body cameras 106, off-body cameras 107 and wearable sensors 108 to evaluate the facial expression and emotion of the user 101 during the performance. For example, if the user 101 has an excited or joyous facial expression and emotion, this may be reflected in feedback which causes the VR-based interactive simulated audience responding positively such as by paying closer attention. Various other examples are possible.

Output of the gaze analysis module 134 and facial expression and emotion analysis module 136 may be aggregated or otherwise combined with output of the content analyzer module 124 by the content and expression aggregation module 138 for providing real-time feedback to the virtual audience simulator module 112 via the real-time content profile generation module 140. For example, aspects such as tone, context, gaze, facial expression, and emotion may be combined so as to select a particular audience profile representing different reactions to the performance of the user 101. Such information may also be aggregated and stored in the audience simulation repository 142, which may be used by the report generation and post-performance analysis module 144 to allow the user to analyze the performance after the simulation is complete or possibly in real-time if the report is dynamically generated and presented to the user during the performance.

In some embodiments, the system 100 is configured to simulate a relevant audience for a particular activity in a specified context, and provides real-time feedback for the performance of the user 101 in the form of stimuli through various output sensors (e.g., VR headset 102, microphones 104, on-body cameras 106, off-body cameras 107, wearable sensors 108, etc.) on or associated with the user 101. Aspects of the performance of the user 101 may be sensed via various input sensors (e.g., VR headset 102, microphones 104, on-body cameras 106, off-body cameras 107, wearable sensors 108, etc.) based at least in part on metrics measured during the performance of the user 101. The system 100 may be further configured to generate reports on the performance of the user 101 to the VR-based interactive simulated audience.

Figure 2:
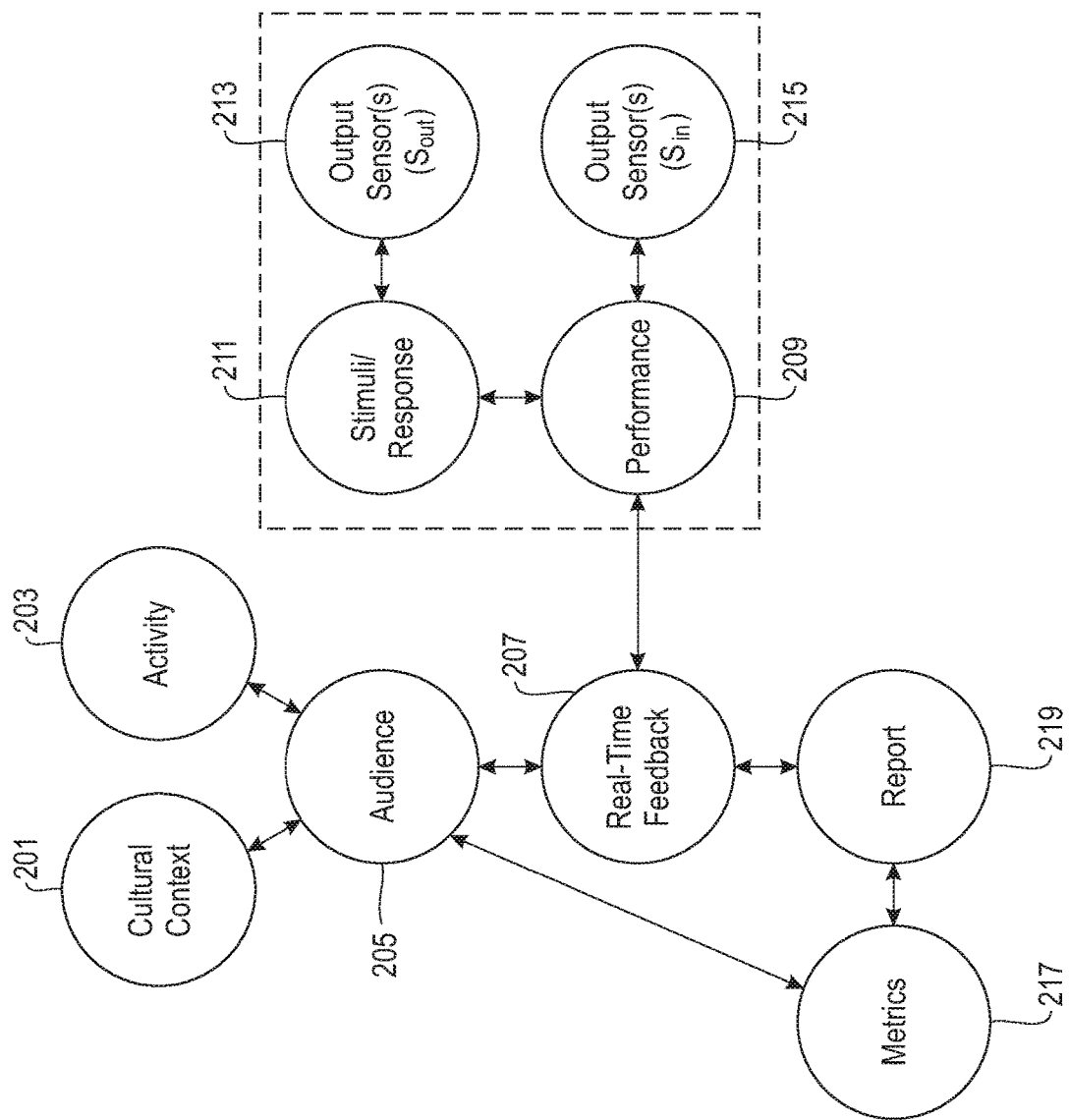
FIG. 2 depicts relationships among functions in a virtual-reality based system for generating audience simulations, according to an exemplary embodiment of the present invention.

FIG. 2 depicts relationships among functions in the system 100 for generating VR-based interactive audience simulations. Cultural context 201 for the performance is either scraped (e.g., via content analyzer module 124) or provided by the user 101. Similarly, an activity 203 may be provided by the user 101, or determined through context (e.g., via situation and location input module 116). The VR-based interactive simulated audience 205 is a function of the cultural context 201 and activity 203 being performed.

Real-time feedback 207 is utilized to make the audience 205 interactive. The real-time feedback 207 is given to the user 101 during the performance, and is a function of the type of audience simulated and the person's performance (e.g., tone, speech, gaze, facial expression, emotion, etc. as measured or determined utilizing tone analyzer module 120, speech-to-text module 122, gaze analysis module 134, facial expression and emotion analysis module 136, etc.). The performance 209 is a function of what the system 100 can sense using input sensors ($S_{in}$) 215. $S_{in}$ 215 include but are not limited to VR headset 102, microphones 104, on-body cameras 106, off-body cameras 107 and wearable sensors 108. Stimuli or response 211 is provided to the user 101 via dynamic or interactive changes in the VR-based simulated audience 205. The stimuli or response 211 is a function of the medium in which it is provided by output sensors ($S_{out}$) 213. $S_{out}$ 213 may include but are not limited to VR headset 102, microphones 104, on-body cameras 106, off-body cameras 107 and wearable sensors 108, etc.

A final report 219 on the performance of the user 101 is a function of the metrics 217 which are available and the continuous real-time feedback 207 that is being given by the system 100. The metrics 217 on which the final report 219 is generated are a function of the VR-based simulated audience 205 that was simulated during the performance of the user 101.

Figure 3:
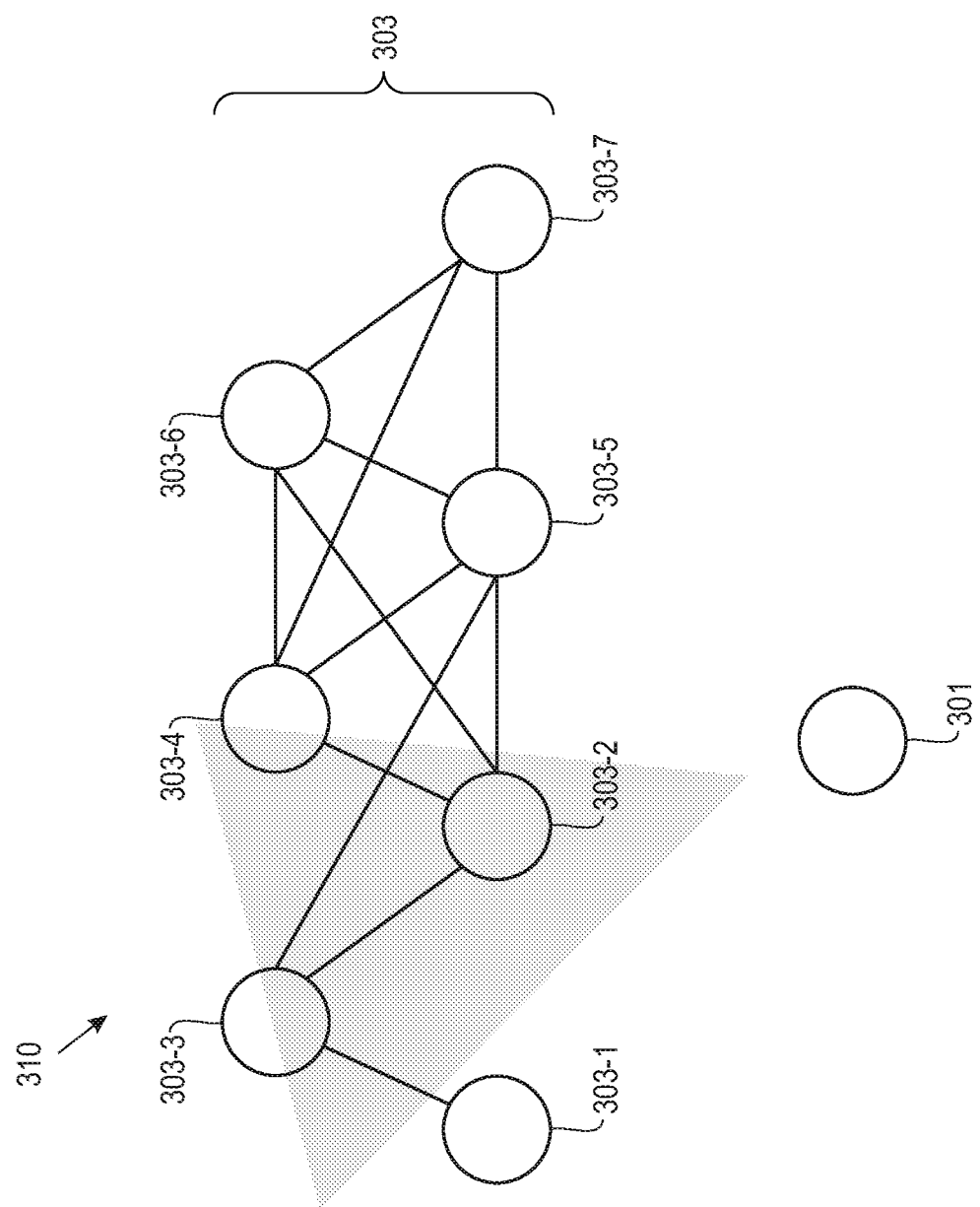
FIG. 3 depicts an example of simulated audience characteristics, according to an exemplary embodiment of the present invention.

FIG. 3 shows examples of simulated audience characteristics. In FIG. 3, a user 301 is giving a performance to a simulated audience with members 303-1 through 303-7 (collectively, simulated audience 303). The user 301 has a current focus 310 (e.g., the user 301 is currently facing a portion of the simulated audience which includes simulated audience members 303-2, 303-3 and 303-4). Characteristics of the simulated audience 303 may include: attention; cues and interjections; simulated body language and appearance; and non-homogenous crowd in a network.

Attention characteristics include but are not limited to visual characteristics of the simulated audience members 303 (e.g., snoring, looking interested, etc.). Attention characteristics may also manifest in the simulated audience members 303 via background chatter or other actions.

Cues and interjection characteristics may include audible and inaudible cues and interjections, applause, boos and cheering, getting up to leave, standing ovations, etc. by the simulated audience members 303.

Simulated body language and appearance characteristics may include posture of the simulated audience members 303 (e.g., sitting, standing, etc.). Simulated body language and appearance characteristics may further be based at least in part on setting, situation and location, and may include the clothing worn by the simulated audience members, physical characteristics (e.g., hairstyles, height and weight, etc.), and body language.

Non-homogenous crowd in a network characteristics may include having the simulated audience members 303 be a diverse crowd (e.g., so as to check or test the user 301's clarity of thought), having an active or passive crowd, etc. The simulated audience members 303 may further be projected as a connected network, so as to measure stage coverage and address quality.

In the FIG. 3 example, the user 301 may be cheery, require attention, and be dressed professionally. To test the performance of the user 301, the simulated audience members 303 may be disinterested, noisy and distracting. This can allow the user 301 to prepare for a potentially unwelcoming or tough crowd. The user 301 may perform a number of simulations before simulated audience members 303 with different characteristics (e.g., with a welcoming crowd that is quiet and interested, with mixed crowds, etc.).

Figure 4:
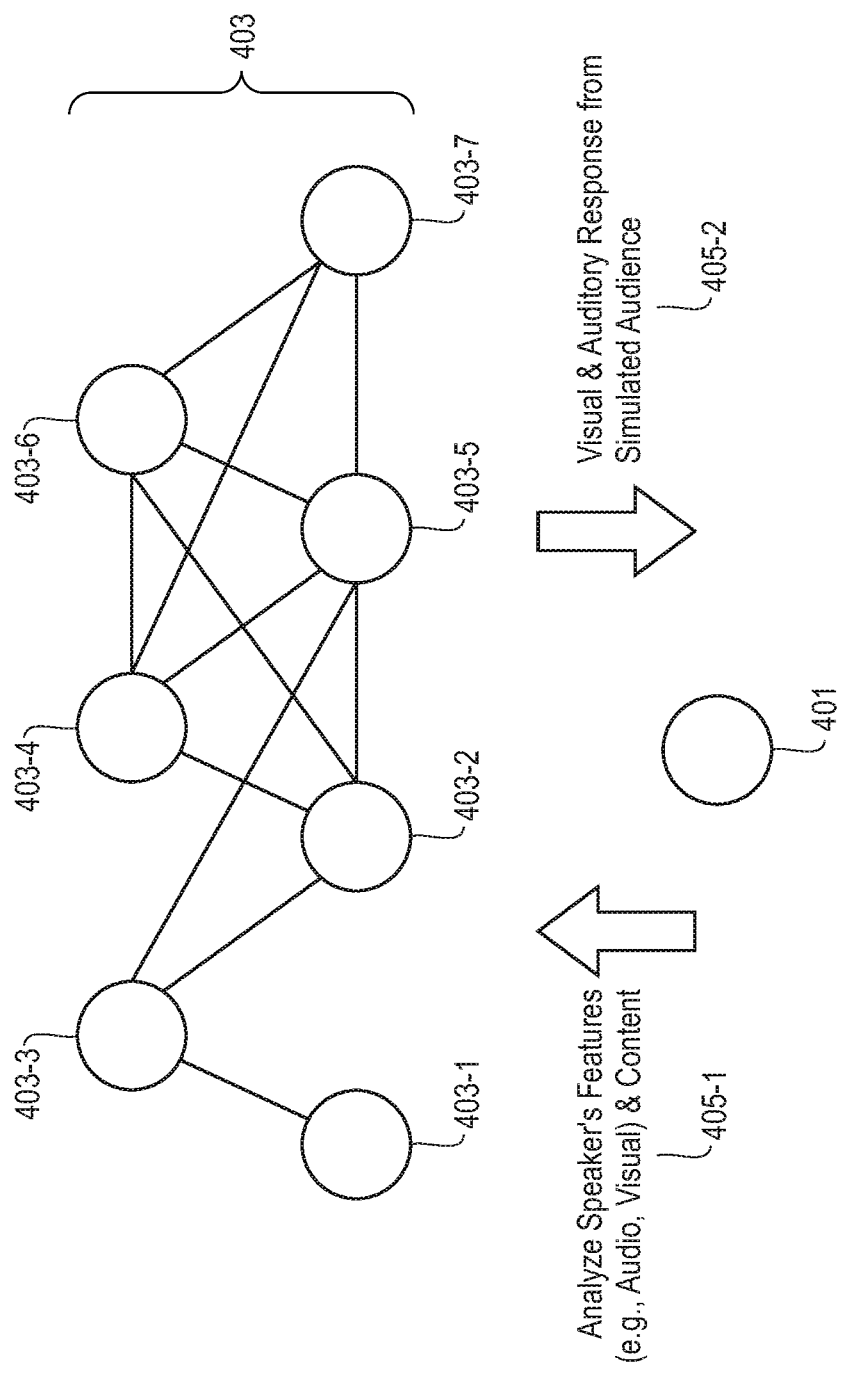
FIG. 4 depicts an example exchange of stimuli between a simulated audience and a user of a virtual-reality based system for generating audience simulations, according to an exemplary embodiment of the present invention.

FIG. 4 shows an example exchange of stimuli between a user 401 and a simulated audience including simulated audience members 403-1 through 403-7 (collectively, simulated audience 403). As the user 401 gives a performance, stimuli 405-1 is provided to the simulated audience 403. The stimuli 405-1 includes features of the speaker or user 401 (e.g., visuals such as gaze, facial expression, emotion, audio such as tone, etc.) and the content of the performance (e.g., the actual text or words spoken by the user 401, etc.). The simulated audience 403 is updated based at least in part on real-time feedback as described herein, and stimuli 405-2 is provided to the user via changes in the VR-based interactive simulated audience 403 (e.g., visual and auditory responses of the simulated audience members 403).

After a performance is completed, various metrics may be calculated and utilized to prepare a report or other customizable feedback to the user 101/301/401. Post-session or post-performance feedback may include information related to the crowd covered, confidence meter, content sensitivity, emotions displayed and evoked, red flags, volume, moments of distraction, and sections to work on.

Crowd covered feedback may include indications of how well the user addressed an entire portion of the simulated audience or how well the user addressed particular desired portions of the simulated audience during the performance. This may take the form of providing a crowd coverage percentage (e.g., "You had a 65% crowd coverage"), or indicating whether the user was addressing the right section or portion of the simulated audience at the right time (e.g., "You were addressing the right set of people 78% of the time").

Confidence meter feedback may include a measure of confidence of the user during the performance, as well as indications of particular aspects of the user's performance that affected the confidence measure (e.g., "You had your arms folded during the presentation and your tone was low. Confidence Rating=6/10").

Content sensitivity feedback may include information related to characteristics of the simulated audience and predicted responses to content based at least in part on characteristics of the audience. For example, social media, news articles and other sources may indicate that particular topics are considered sensitive to different demographics, resulting in specific feedback (e.g., "In the audience you are addressing, 50% of the audience members are in the age range of 40-55. From historical data, it is understood that remarks on the topics of your performance have received a negative response in this demographic."). The feedback may be more specific, such as identifying particular topics or content of the speech that are deemed sensitive content (e.g., "You touched on the topic of a river dispute, which is a sensitive topic given its media coverage and negative sentiment.").

Emotions displayed and evoked feedback may indicate particular emotions of the user that are detected during the performance, possibly in conjunction with specific content of the speech (e.g., "You displayed anger during the [ ] section of your talk") as well as particular emotions that are evoked in the simulated audience during the performance (e.g., "You evoked laughter during the [ ] section of your talk").

Red-flags feedback may identify particular aspects of the user's performance that are negative or potentially problematic (e.g., "You used the slang "$%*^#" multiple times during your talk," "You pronounced the salutation in French wrong," "Your gaze was towards the presentation instead of the audience most of the time," etc.).

Volume feedback may identify whether the user was audible during the presentation, possibly at particular sections or by regions of the simulated audience (e.g., "You were not audible to the last row in the simulated auditorium").

Moments-of-distraction feedback may indicate to the user when they appeared distracted during the performance, or when the simulated audience appeared distracted during the performance (e.g., "You lost engagement with the audience and had a prolonged period of silence during the [ ] section of your talk").

Sections-to-work-on feedback may indicate to the user particular portions of the performance to work on, possibly along with suggestions or reasons to work on such portions (e.g., "Overall, you seemed confident during the [ ] section of your talk," "The [ ] section of your talk was not legible due to constant fumbling; delivery should be worked on").

It should be appreciated that the particular feedback described above is presented by way of example only, and that numerous other specific feedback may be provided in the above-described categories. Further, feedback is not limited solely to the categories noted above.

Figure 5:
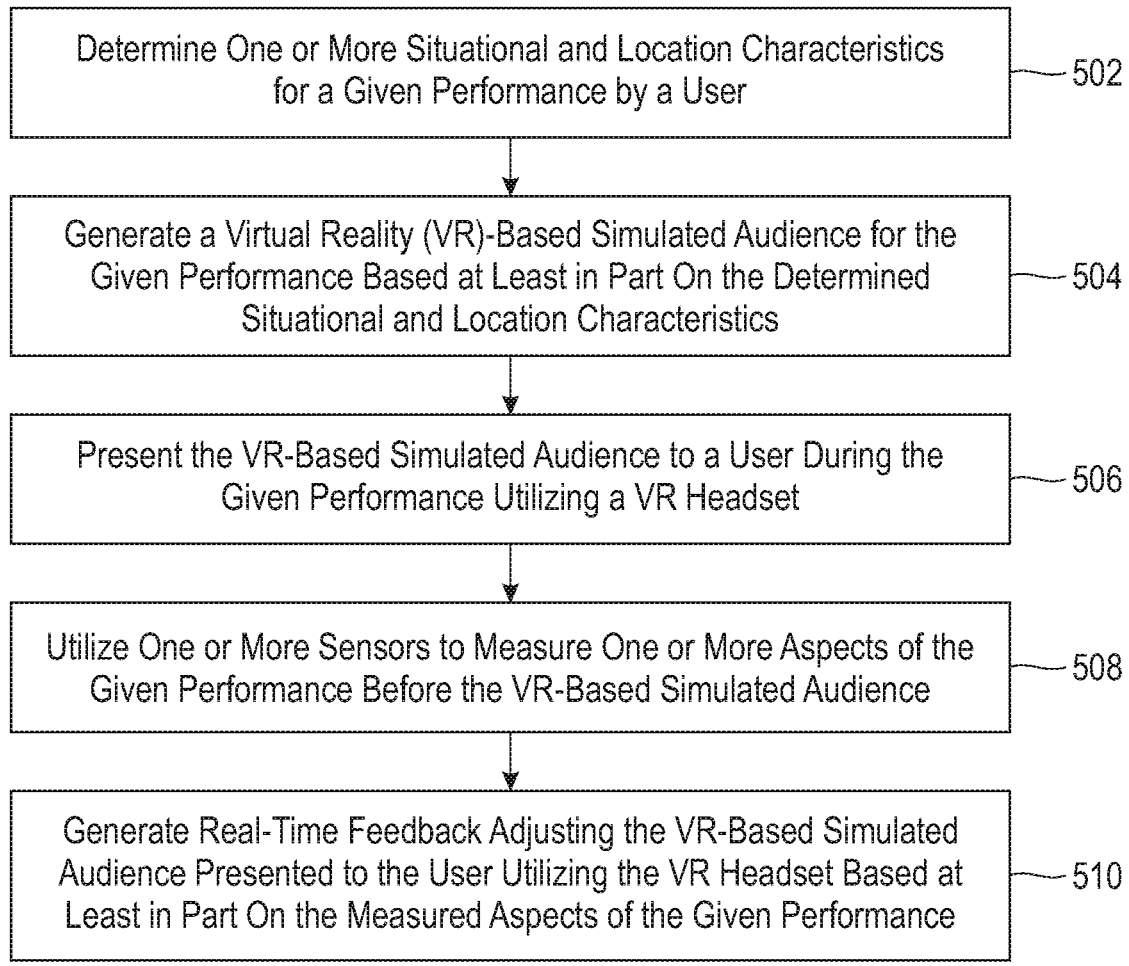
FIG. 5 depicts a process for generating an interactive simulated virtual reality audience, according to an exemplary embodiment of the present invention.

FIG. 5 depicts a processing flow 500 for generating VR-based interactive audience simulations. The processing flow 500 begins with step 502, determining one or more situational and location characteristics for a given performance by a user. Step 502 may include selecting a geographic location for the given performance and selecting demographics of members of the VR-based simulated audience for the given performance. More generally, step 502 includes determining a context for the given performance by the user.

In step 504, a VR-based simulated audience for the given performance is generated based at least in part on the determined situational and location characteristics. Step 504 may include generating a plurality of simulated audience members for the VR-based simulated audience in proportion to the selected demographics of the simulated audience, and generating a venue for the VR-based simulated audience based at least in part on the selected geographic location for the given performance. Step 504 may also or alternatively include selecting an audience profile from an audience profile repository based at least in part on the selected geographic location and the selected demographics.

The VR-based simulated audience is presented to the user during the given performance in step 506. Step 506 may utilize a VR headset. A VR headset, as described above, includes a device configured to provide stimuli to and receive stimuli from a user, and is not limited solely to exchanging audio or visual stimulus with the user. The VR headset may include or be configured to interact with other types of sensors that provide these and other forms of stimuli to the user, including but not limited to olfactory and haptic feedback.

The processing flow 500 continues with step 508, utilizing one or more sensors to measure one or more aspects of the given performance before the VR-based simulated audience. Step 508 may include utilizing at least one microphone to capture audio of the user during the given performance, and determining a tone of the user based at least in part on the captured audio. Step 508 may further or alternatively include utilizing at least one microphone to capture audio of the user during the given performance, converting speech of the captured audio to text, and analyzing the speech to determine a set of topics discussed during the given performance. Step 508 may further or alternatively include utilizing at least one of an on-body camera, an off-body camera and a wearable sensor associated with the user to capture a gaze of the user during the given performance, and determining portions of the VR-based simulated audience which are inside and outside the gaze of the user during different portions of the given performance. Step 508 may further or alternatively include utilizing at least one of an on-body camera, an off-body camera and a wearable sensor associated with the user to capture at least one of a facial expression and emotion of the user during the given performance.

In step 510, real-time feedback is generated for adjusting the VR-based simulated audience presented to the user utilizing the VR headset based at least in part on the measured aspects of the given performance. Step 510 may include utilizing at least one feedback repository to identify reactions of different types of audience members to the measured aspects of the given performance, and adjusting characteristics of respective ones of a plurality of members of the VR-based simulated audience to provide the identified reactions for the different types of audience members in proportion to the representation of the different types of audience members in the VR-based simulated audience. The characteristics may relate to attention (e.g., visual representations of interest, background noise, etc.), cues and interjections (e.g., applause, audience members leaving, etc.), simulated body language and appearance (e.g., posture, body language of respective members of the simulated audience, etc.), characteristics relating to a non-homogenous crowd in a network (e.g., a diversity of the reactions of the simulated audience members, projecting the audience members as a connected network measuring coverage and address quality, etc.).

Figure 6:
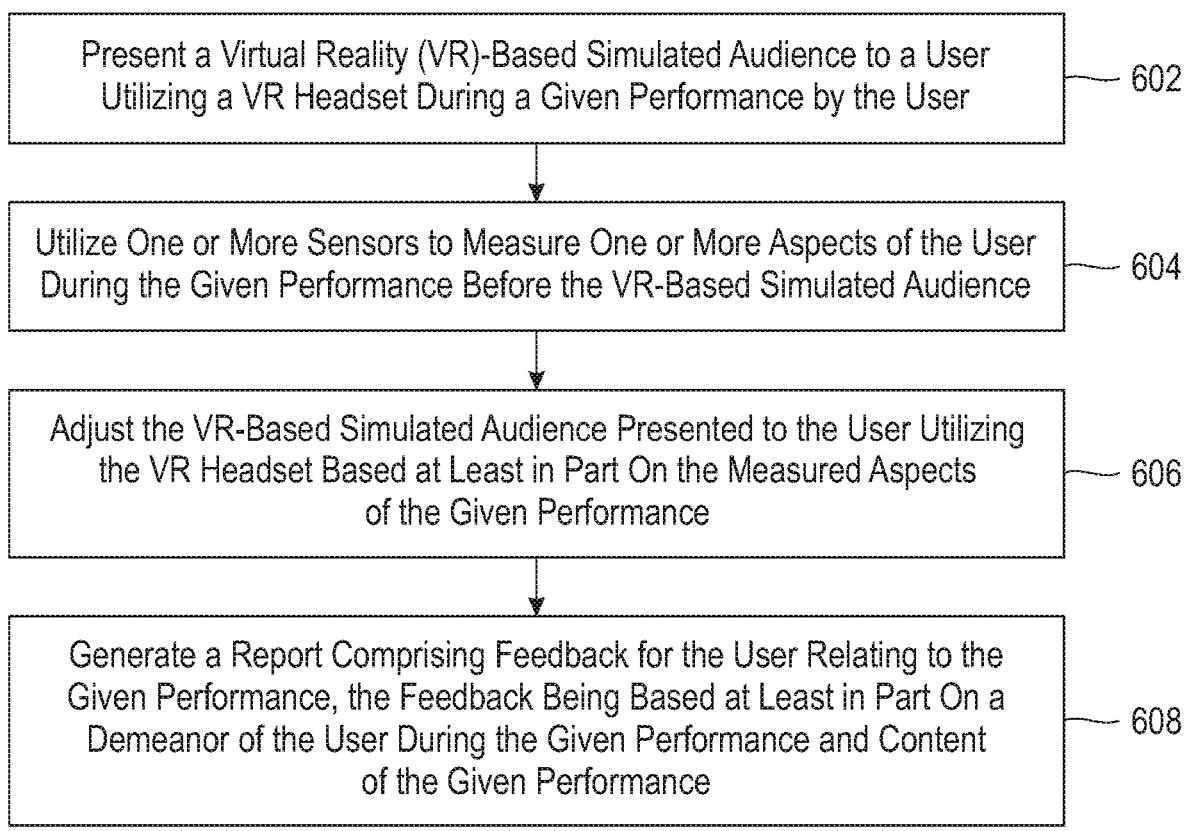
FIG. 6 depicts a process for providing post-performance analysis of a performance made to an interactive simulated virtual reality audience, according to an exemplary embodiment of the present invention.

FIG. 6 depicts a processing flow 600 for providing post-performance analysis of performances to VR-based interactive audience simulations. The processing flow 600 begins with step 602, presenting a VR-based simulated audience to a user utilizing a VR headset during a given performance by the user. One or more sensors are utilized in step 604 to measure one or more aspects of the user during the given performance before the VR-based simulated audience, and the VR-based simulated audience presented to the user utilizing the VR headset is adjusted in step 606 based at least in part on the measured aspects of the given performance. In step 608, a report is generated comprising feedback for the user relating to the given performance, the feedback being based at least in part on a demeanor of the user during the given performance and content of the given performance. The feedback based on the demeanor of the user during the given performance may include a crowd coverage of the VR-based simulated audience during at least a portion of the given performance, a confidence measure of the user during at least a portion of the given performance, one or more emotions displayed by the user during at least a portion of the given performance, one or more emotions evoked in the VR-based simulated audience during at least a portion of the given performance, a volume measure of the user during at least a portion of the given performance, a distraction measure of the user during at least a portion of the given performance, etc. The feedback based at least in part on the content of the given performance may include identifying at least a portion of the given performance containing culturally sensitive content, one or more recommendations for improving at least a portion of the given performance, etc.

Illustrative embodiments provide a number of advantages relative to conventional techniques. For example, conventional techniques are often limited to creating VR simulations for an audience or for providing an experience whereby a user can simulate attendance at a live event. Conventional techniques do not provide VR-based interactive simulated audiences.

VR-based interactive simulated audiences provide various advantages, including relative to techniques which solely analyze whether the text of a speech or other performance is compatible with an audience. While the script or text of a speech or other performance may be submitted to content analyzer module 124 as described above via speech-to-text module 122, textual analysis alone does not provide the advantages of an immersive VR-based interactive audience simulation. In the case of a script it is difficult or not possible to measure the intention or performance of the user. For example, a system may determine or identify a culturally sensitive topic for an audience at a particular geographic location. Script or text analysis may be able to point out the sections of the speech or performance where the culturally sensitive topic is discussed, but script or text analysis may fail to identify the sentiment in which the culturally sensitive topic is discussed. By analyzing the gestures, expressions and tone of the speaker while discussing the culturally sensitive topic during an immersive performance before a VR-based interactive simulated audience, embodiments can obtain a more clear picture of "how" the culturally sensitive topic is discussed including determining whether the culturally sensitive topic is talked about in a healthy manner. Thus, analyzing the users other modalities via analyzing a performance before a VR-based interactive simulated audience provides various advantages.

In addition, utilizing a VR-based interactive simulated audience provides various advantages in that it allows for real-time self-correction by the user giving the performance. When the user makes mistakes (e.g., when talking about a culturally sensitive topic, ignoring sections of an audience, speaking too low, not having good posture or facial expression) the simulated audience will adapt to indicate such to the user in real time. The user can then adjust performance to account for and remedy such mistakes.

In some embodiments, the VR-based simulated audiences are dynamic and interactive, in that they are not hard-coded to react in a specific way but instead adapt to the content and expressions of the user during the performance. Further, the VR-based simulated audience in some embodiments provide reactions which are specific to situation and location (e.g., to the geography chosen and its associated culture). Data are intelligently collected from various sources (e.g., social media, news articles, etc.) and also from analysis of past performances (e.g., machine learning based video analysis of past performances) to create a cultural audit profile of the simulated audience. Some embodiments further identify what sort of behavior (e.g., characterized by speech, tone, expressions, body language, etc.) is acceptable, well received or disrespectful to a particular simulated audience.

Some embodiments further generate the simulated audience in the VR setting such that the simulated audience members are appropriately distributed to represent the cultural profile in its correct proportions. For example, if the cultural profile indicates that only a small section of the target audience would find a particular gesture offensive, then only that representative proportion of the simulated audience is triggered if the user performs that gesture. Thus, some embodiments automatically and intelligently create an audience given a situation and location, rather than using a hard-coded audience.

Some embodiments also provide detailed and customized feedback to the user, both real-time and offline or after the performance. Feedback in some embodiments is not limited solely to analyzed features such as speech recognition, vocals analysis, facial recognition, etc. Further, some embodiments do not subscribe to universal notions of certain values of these and other features as being "good" or "bad" (e.g., that low tone voice displays lack of confidence). Instead, some embodiments identify features on which feedback is supposed to be given on its own, in an unsupervised manner. For example, in some embodiments the system first identifies if a particular feature (e.g., voice tone) is a feature that actually matters for the particular simulated audience (e.g., the situation and location, the culture and geography, etc.). If it is determined that the feature matters, it is further determined how much it matters again specific to the characteristics of the simulated audience. In some cases, for example, a low tone voice may be attractive to a particular type of simulated audience. Some embodiments further provide feedback based at least in part on identified cultural audit profiles both in real-time and offline after completion of a performance.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
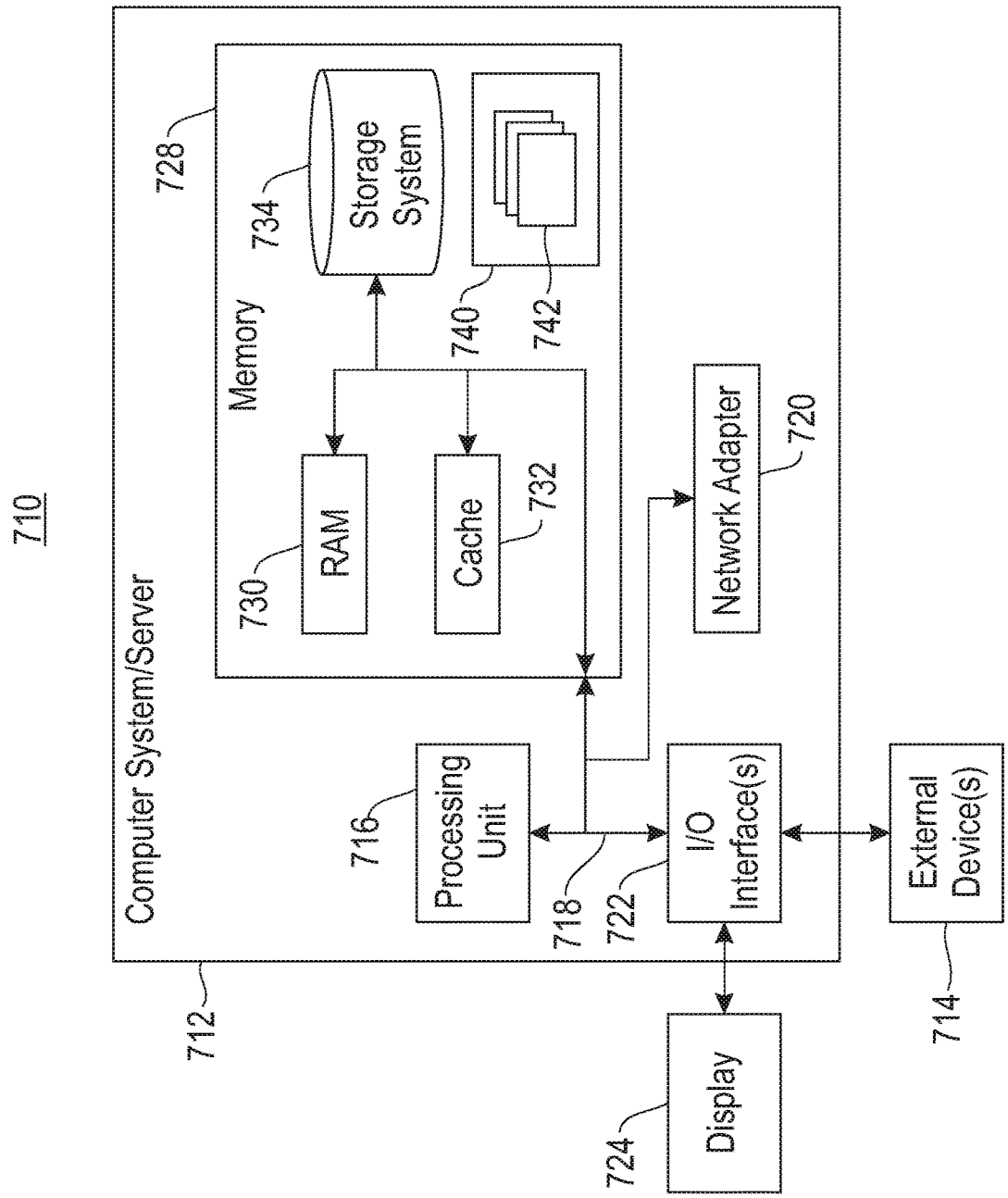
FIG. 7 depicts a computer system in accordance with which one or more components/steps of techniques of the invention may be implemented, according to an exemplary embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
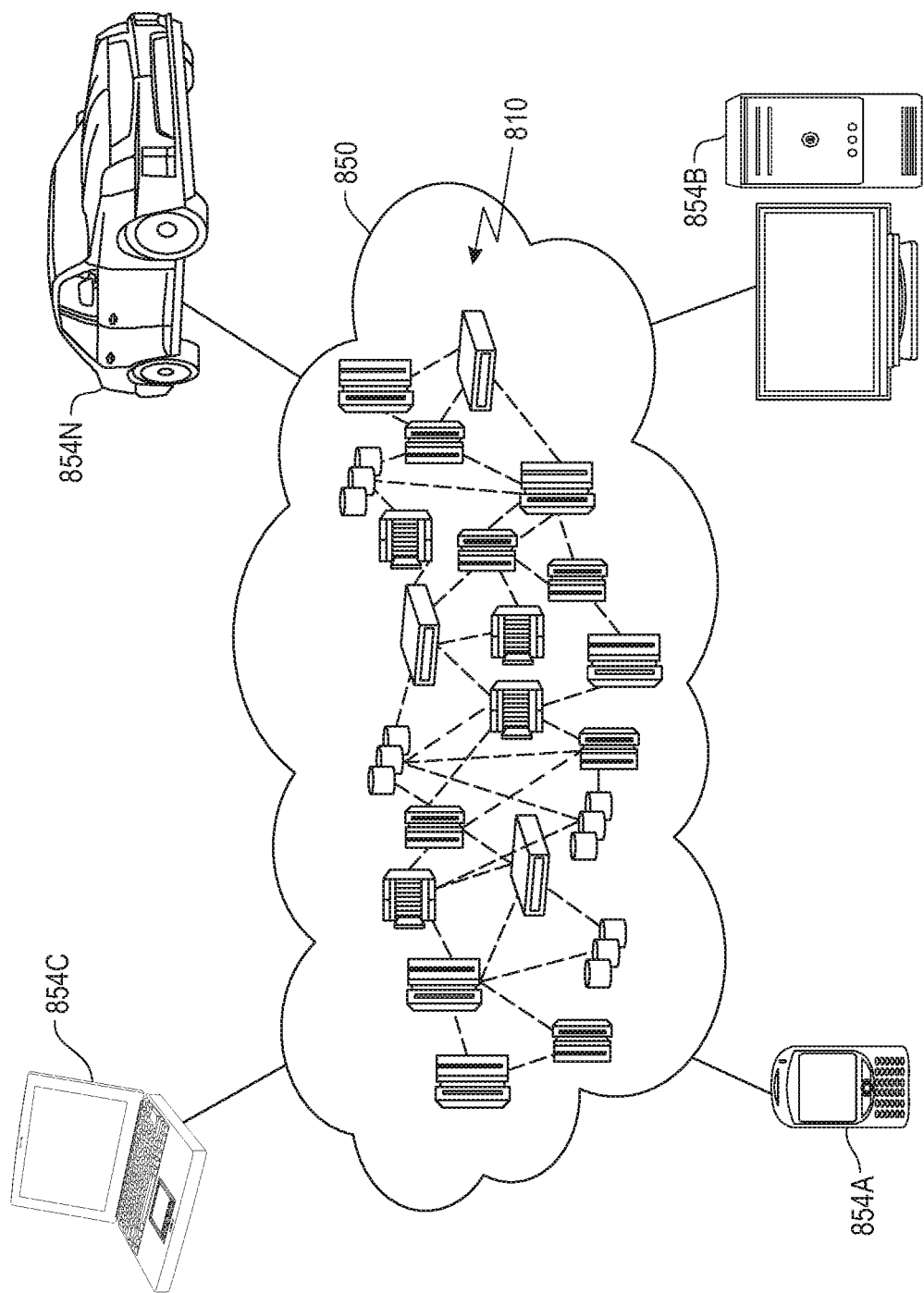
FIG. 8 depicts a cloud computing environment, according to an exemplary embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
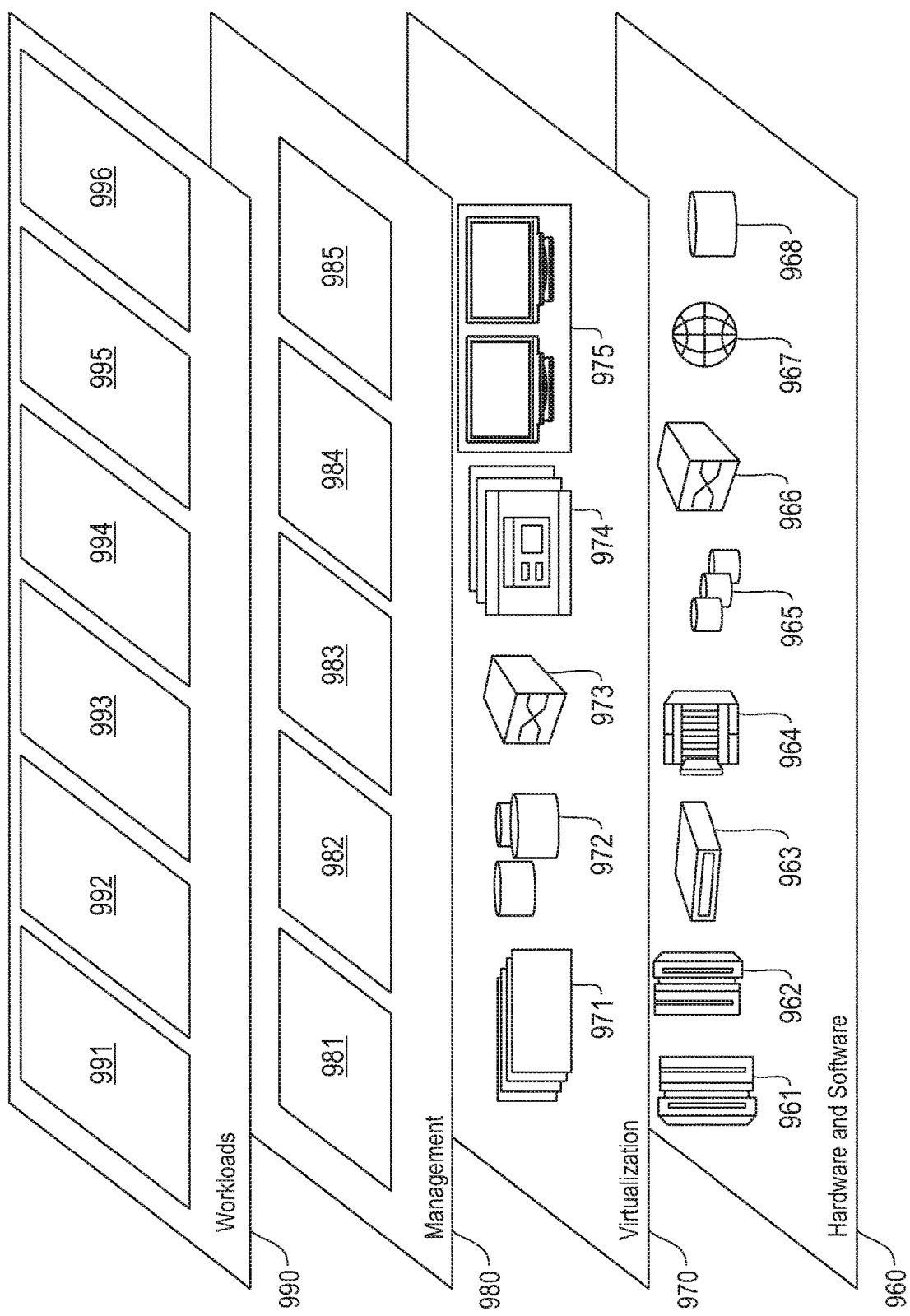
FIG. 9 depicts abstraction model layers, according to an exemplary embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and VR-based audience simulation processing 996, which may perform various functions described above with respect to generating VR-based interactive audience simulations, and for providing post-performance analysis of performances made to VR-based interactive audience simulations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
determining one or more situational and location characteristics for a given performance by a user;
generating a virtual reality (VR)-based simulated audience for the given performance based at least in part on the determined situational and location characteristics;
presenting the VR-based simulated audience to a user during the given performance utilizing a VR headset;
utilizing one or more sensors to measure one or more aspects of the given performance before the VR-based simulated audience; and generating real-time feedback adjusting the VR-based simulated audience presented to the user utilizing the VR headset based at least in part on the measured aspects of the given performance, wherein said generating the real-time feedback comprises:
  utilizing at least one feedback repository to identify reactions of different types of audience members to the measured aspects of the given performance; and
  adjusting characteristics of respective ones of a plurality of members of the VR-based simulated audience to provide the identified reactions for the different types of audience members in proportion to the representation of the different types of audience members in the VR-based simulated audience, wherein said adjusting characteristics of respective ones of the plurality of members of the VR-based simulated audience comprises:
    adjusting characteristics relating to cues and interjections, the characteristics relating to cues and interjections comprising (i) applause carried out by one or more of the plurality of members of the VR-based simulated audience during the given performance and (ii) one or more of the plurality of members of the VR-based simulated audience leaving the VR-based simulated audience during the given performance; and
    adjusting characteristics relating to a non-homogenous portion of the VR-based simulated audience comprising (i) a diversity of reactions of the non-homogenous portion of the VR-based simulated audience members and (ii) projection of the non-homogenous portion of the VR-based simulated audience members as a connected network measuring (a) audience coverage percentage and (b) address accuracy percentage of the user with respect to the non-homogenous portion of the VR-based simulated audience members;
  wherein the steps are carried out by at least one processing device.

2. The computer-implemented method of claim 1, wherein said determining the one or more situational and location characteristics for the given performance comprises:
  selecting a geographic location for the given performance; and
  selecting demographics of members of the VR-based simulated audience for the given performance.

3. The computer-implemented method of claim 2, wherein said generating the VR-based simulated audience for the given performance comprises:
  generating a plurality of simulated audience members for the VR-based simulated audience in proportion to the selected demographics of the simulated audience; and
  generating a venue for the VR-based simulated audience based at least in part on the selected geographic location for the given performance.

4. The computer-implemented method of claim 2, wherein said generating the VR-based simulated audience for the given performance comprises selecting an audience profile from an audience profile repository based at least in part on the selected geographic location and the selected demographics.

5. The computer-implemented method of claim 1, wherein said utilizing one or more sensors to measure one or more aspects of the given performance before the VR-based simulated audience comprises:
  utilizing at least one microphone to capture audio of the user during the given performance; and
  determining a tone of the user based at least in part on the captured audio.

6. The computer-implemented method of claim 1, wherein said utilizing one or more sensors to measure one or more aspects of the given performance before the VR-based simulated audience comprises:
  utilizing at least one microphone to capture audio of the user during the given performance;
  converting speech of the captured audio to text; and
  analyzing the speech to determine a set of topics discussed during the given performance.

7. The computer-implemented method of claim 1, wherein said utilizing one or more sensors to measure one or more aspects of the given performance before the VR-based simulated audience comprises:
  utilizing at least one of an on-body camera, an off-body camera and a wearable sensor associated with the user to capture a gaze of the user during the given performance; and
  determining portions of the VR-based simulated audience which are inside and outside the gaze of the user during different portions of the given performance.

8. The computer-implemented method of claim 1, wherein said utilizing one or more sensors to measure one or more aspects of the given performance before the VR-based simulated audience comprises:
  utilizing at least one of an on-body camera, an off-body camera and a wearable sensor associated with the user to capture at least one of a facial expression and emotion of the user during the given performance.

9. The computer-implemented method of claim 1, wherein said adjusting characteristics of respective ones of the plurality of members of the VR-based simulated audience comprises adjusting one or more characteristics relating to attention, the one or more characteristics relating to attention comprising at least one of visual representations of interest and background noise.

10. The computer-implemented method of claim 1, wherein said adjusting characteristics of respective ones of the plurality of members of the VR-based simulated audience comprises adjusting one or more characteristics relating to simulated body language and appearance, the one or more characteristics relating to simulated body language and appearance comprising at least one of posture and body language.

11. A computer program product, the computer program product comprising a Non-Transitory computer readable storage medium having program instructions embodied therewith, the program instructions executable by at least one computing device to cause the at least one computing device to perform steps of:
  determining one or more situational and location characteristics for a given performance by a user;
  generating a virtual reality (VR)-based simulated audience for the given performance based at least in part on the determined situational and location characteristics;
  presenting the VR-based simulated audience to a user during the given performance utilizing a VR headset;
  utilizing one or more sensors to measure one or more aspects of the given performance before the VR-based simulated audience; and
  generating real-time feedback adjusting the VR-based simulated audience presented to the user utilizing the VR headset based at least in part on the measured aspects of the given performance, wherein said generating the real-time feedback comprises:
utilizing at least one feedback repository to identify reactions of different types of audience members to the measured aspects of the given performance; and
adjusting characteristics of respective ones of a plurality of members of the VR-based simulated audience to provide the identified reactions for the different types of audience members in proportion to the representation of the different types of audience members in the VR-based simulated audience, wherein said adjusting characteristics of respective ones of the plurality of members of the VR-based simulated audience comprises:
adjusting characteristics relating to cues and interjections, the characteristics relating to cues and interjections comprising (i) applause carried out by one or more of the plurality of members of the VR-based simulated audience during the given performance and (ii) one or more of the plurality of members of the VR-based simulated audience leaving the VR-based simulated audience during the given performance; and
adjusting characteristics relating to a non-homogenous portion of the VR-based portion of the VR-based simulated audience members and (ii) projection of the non-homogenous portion of the VR-based simulated audience members as a connected network measuring (a) audience coverage percentage and (b) address accuracy percentage of the user with respect to the non-homogenous portion of the VR-based simulated audience members.

12. A system comprising:
a memory; and
at least one processor coupled to the memory and configured for:
determining one or more situational and location characteristics for a given performance by a user;
generating a virtual reality (VR)-based simulated audience for the given performance based at least in part on the determined situational and location characteristics;
presenting the VR-based simulated audience to a user during the given performance utilizing a VR headset;
utilizing one or more sensors to measure one or more aspects of the given performance before the VR-based simulated audience; and
generating real-time feedback adjusting the VR-based simulated audience presented to the user utilizing the VR headset based at least in part on the measured aspects of the given performance, wherein said generating the real-time feedback comprises:
utilizing at least one feedback repository to identify reactions of different types of audience members to the measured aspects of the given performance; and
adjusting characteristics of respective ones of a plurality of members of the VR-based simulated audience to provide the identified reactions for the different types of audience members in proportion to the representation of the different types of audience members in the VR-based simulated audience, wherein said adjusting characteristics of respective ones of the plurality of members of the VR-based simulated audience comprises:
adjusting characteristics relating to cues and interjections, the characteristics relating to cues and interjections comprising (i) applause carried out by one or more of the plurality of members of the VR-based simulated audience during the given performance and (ii) one or more of the plurality of members of the VR-based simulated audience leaving the VR-based simulated audience during the given performance; and
adjusting characteristics relating to a non-homogenous portion of the VR-based simulated audience comprising (i) a diversity of reactions of the non-homogenous portion of the VR-based simulated audience members and (ii) projection of the non-homogenous portion of the VR-based simulated audience members as a connected network measuring (a) audience coverage percentage and (b) address accuracy percentage of the user with respect to the non-homogenous portion of the VR-based simulated audience members.

13. A computer-implemented method, comprising steps of:
presenting a virtual reality (VR)-based simulated audience to a user utilizing a VR headset during a given performance by the user;
utilizing one or more sensors to measure one or more aspects of the user during the given performance before the VR-based simulated audience;
adjusting the VR-based simulated audience presented to the user utilizing the VR headset based at least in part on the measured aspects of the given performance, wherein said adjusting the VR-based simulated audience comprises:
utilizing at least one feedback repository to identify reactions of different types of audience members to the measured aspects of the given performance; and
adjusting characteristics of respective ones of a plurality of members of the VR-based simulated audience to provide the identified reactions for the different types of audience members in proportion to the representation of the different types of audience members in the VR-based simulated audience, wherein said adjusting characteristics of respective ones of the plurality of members of the VR-based simulated audience comprises:
adjusting characteristics relating to cues and interjections, the characteristics relating to cues and interjections comprising (i) applause carried out by one or more of the plurality of members of the VR-based simulated audience during the given performance and (ii) one or more of the plurality of members of the VR-based simulated audience leaving the VR-based simulated audience during the given performance; and
adjusting characteristics relating to a non-homogenous portion of the VR-based simulated audience comprising (i) a diversity of reactions of the non-homogenous portion of the VR-based simulated audience members and (ii) projection of the non-homogenous portion of the VR-based simulated audience members as a connected network measuring (a) audience coverage percentage and (b) address accuracy percentage of the user with respect to the non-homogenous portion of the VR-based simulated audience members; and
generating a report comprising feedback for the user relating to the given performance, the feedback being based at least in part on a demeanor of the user during the given performance and content of the given performance;

wherein the steps are carried out by at least one processing device.

14. The computer-implemented method of claim 13, wherein the feedback based at least in part on the demeanor of the user during the given performance comprises at least one of:
- a confidence measure of the user during at least a portion of the given performance;
- one or more emotions displayed by the user during at least a portion of the given performance;
- one or more emotions evoked in the VR-based simulated audience during at least a portion of the given performance;
- a volume measure of the user during at least a portion of the given performance; and
- a distraction measure of the user during at least a portion of the given performance.

15. The computer-implemented method of claim 13, wherein the feedback based at least in part on the content of the given performance comprises at least one of:
- identifying at least a portion of the given performance containing culturally sensitive content; and
- one or more recommendations for improving at least a portion of the given performance.

* * * * *